US012147174B2

(12) United States Patent
Oba et al.

(10) Patent No.: US 12,147,174 B2
(45) Date of Patent: Nov. 19, 2024

(54) INTERMEDIATE TRANSFER UNIT AND IMAGE FORMING APPARATUS

(71) Applicant: KYOCERA Document Solutions Inc., Osaka (JP)

(72) Inventors: Keisuke Oba, Osaka (JP); Koji Uno, Osaka (JP); Yasuhiro Michishita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/490,578

(22) Filed: Oct. 19, 2023

(65) Prior Publication Data

US 2024/0142899 A1 May 2, 2024

(30) Foreign Application Priority Data

Oct. 26, 2022 (JP) ................................ 2022-171118

(51) Int. Cl.
*G03G 15/16* (2006.01)
*G03G 15/18* (2006.01)

(52) U.S. Cl.
CPC ......... *G03G 15/1615* (2013.01); *G03G 15/18* (2013.01); *G03G 2215/0016* (2013.01)

(58) Field of Classification Search
CPC ............... G03G 15/1615; G03G 15/18; G03G 2215/0016; G03G 15/1605; G03G 15/162
See application file for complete search history.

(56) References Cited

U.S. PATENT DOCUMENTS

2005/0137745 A1* 6/2005 Takayama .......... G03G 15/1605 700/230
2005/0214035 A1* 9/2005 Kamiya ............. G03G 15/1605 399/301
2008/0175621 A1* 7/2008 Furuya ............... G03G 15/1615 399/165
2009/0238614 A1* 9/2009 Kakyo ............... G03G 15/1615 399/302
2011/0026956 A1* 2/2011 Taguchi ............. G03G 15/1605 399/49
2012/0082489 A1* 4/2012 Shirakata ........... G03G 15/1615 399/302
2014/0255063 A1* 9/2014 Kiryu ................. G03G 15/1615 399/302
2020/0387106 A1* 12/2020 Hatano .............. G03G 15/1615

FOREIGN PATENT DOCUMENTS

JP 2006-300986 A 11/2006

* cited by examiner

*Primary Examiner* — Sandra Brase
(74) *Attorney, Agent, or Firm* — Stein IP LLC

(57) ABSTRACT

The intermediate transfer unit includes: an endless intermediate transfer belt which is turned around while carrying a toner image on its outer circumferential surface; and a plurality of rollers on which the intermediate transfer belt is turnably stretched, wherein the intermediate transfer belt has, on its inner circumferential surface, an information recording area in which belt information has been recorded, and the intermediate transfer belt has a mark at a position in the outer circumferential surface where a positional relationship between the mark and the information recording area comes to a specified relationship.

6 Claims, 12 Drawing Sheets

INTERMEDIATE TRANSFER UNIT AND IMAGE FORMING APPARATUS

INCORPORATION BY REFERENCE

This application is based on and claims the benefit of priority from Japanese Patent Application No. 2022-171118 filed on Oct. 26, 2022, the contents of which are hereby incorporated by reference.

BACKGROUND

The present disclosure relates to an intermediate transfer unit and an image forming apparatus.

An intermediate transfer unit of an image forming apparatus includes an intermediate transfer belt which turns around with a toner image carried thereon. For example, belt information is recorded on an outer circumferential surface of the intermediate transfer belt.

SUMMARY

An intermediate transfer unit according to a first aspect of the present disclosure includes an endless intermediate transfer belt and a plurality of rollers. The intermediate transfer belt is turned around while carrying a toner image on its outer circumferential surface. The plurality rollers allow the intermediate transfer belt to be turnably stretched thereon. The intermediate transfer belt has, on its inner circumferential surface, an information recording area in which belt information has been recorded. The intermediate transfer belt has a mark at a position in the outer circumferential surface where a positional relationship between the mark and the information recording area comes to a specified relationship.

An image forming apparatus according to a second aspect of the disclosure includes the intermediate transfer unit.

DETAILED DESCRIPTION

Hereinbelow, an image forming apparatus according to one embodiment of the present disclosure will be described by taking a tandem-type color laser printer as an example. However, image forming apparatuses applicable to this disclosure are not limited to printers. The disclosure is applicable also to multifunction peripherals having copying and other functions. In the following description, a direction perpendicular to a floor plane on which the image forming apparatus is installed will be defined as an up/down direction.

<General Configuration of Image Forming Apparatus>

Figure 1:
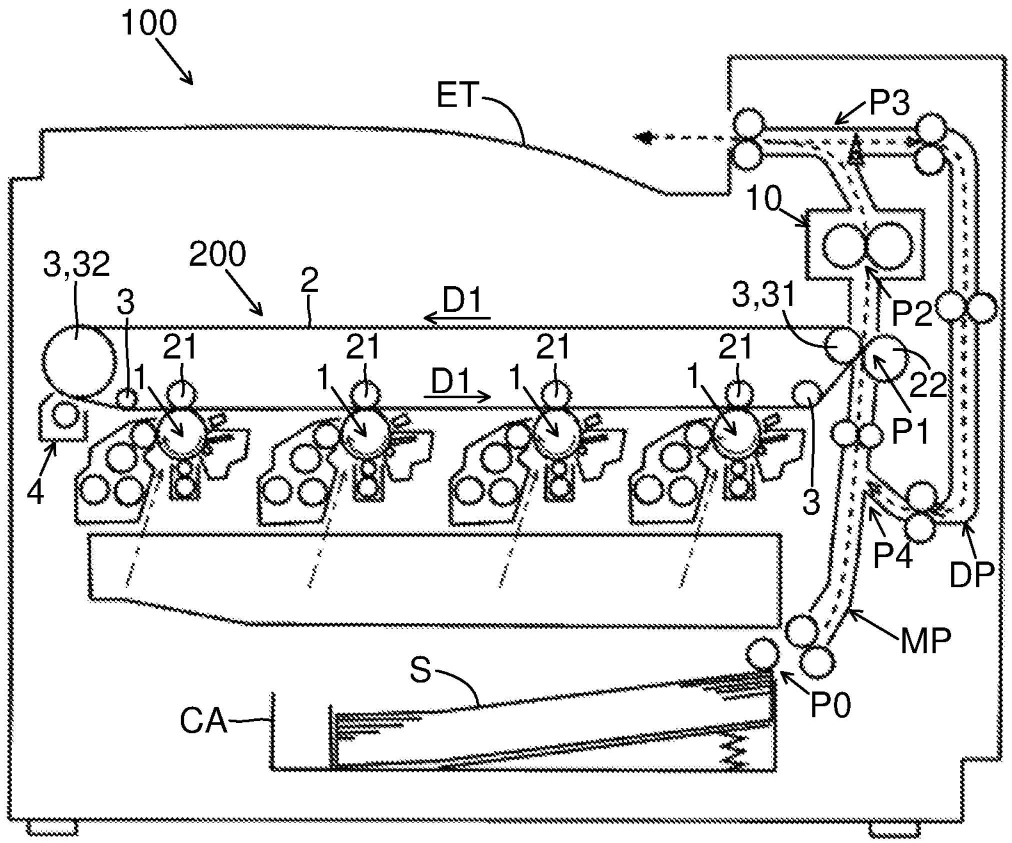
FIG. 1 is a schematic diagram of an image forming apparatus according to one embodiment.

As shown in FIG. 1, an image forming apparatus 100 of the present embodiment includes a main conveyance path MP. The image forming apparatus 100 also includes a sheet cassette CA. The sheet cassette CA is settable to and removable from a body of the image forming apparatus 100. Sheets S to be used for print jobs are housed in the sheet cassette CA. The main conveyance path MP ranges from a feed position P0, at which a sheet S is to be fed from the sheet cassette CA, via a transfer position P1 and a fixing position P2 to a discharge tray ET.

In a print job, a sheet S in the sheet cassette CA is fed from the feed position P0 onto the main conveyance path MP. The image forming apparatus 100 conveys the sheet S along the main conveyance path MP. Then, the image forming apparatus 100 prints an image on the sheet S that is under conveyance. In other words, the image forming apparatus 100 transfers a toner image onto the sheet S that is under conveyance. Transfer of a toner image onto the sheet S that is under conveyance is executed in the transfer position P1.

In addition, the sheet cassette CA is set in lower part of the body of the image forming apparatus 100. The transfer position P1 is located upward of the feed position P0 for feed of the sheet S from the sheet cassette CA onto the main conveyance path MP. For this reason, after the feed of the sheet S onto the main conveyance path MP, the sheet S is conveyed from downward to upward.

The image forming apparatus 100 includes image forming parts 1 corresponding to four colors of cyan, magenta, yellow and black. Each image forming part 1 forms toner images in its corresponding color. Hereinbelow, configurational description will be given by focusing on one image forming part 1. The image forming parts 1 are identical in basic configuration to one another. Accordingly, configurational description of the other image forming parts 1 will be omitted by incorporating referential aid of the following description.

Figure 2:
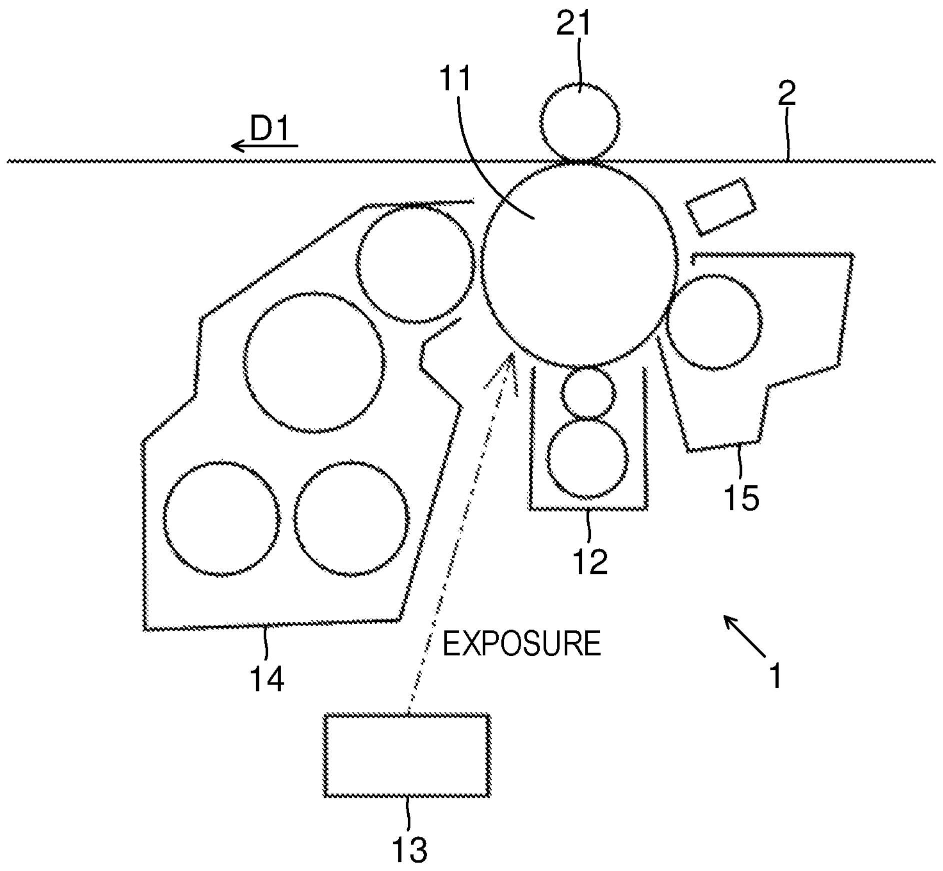
FIG. 2 is a schematic diagram of an image forming part according to the embodiment.

The image forming part 1, as shown in FIG. 2, includes a photosensitive drum 11, a charging device 12, an exposure device 13, a developing device 14, and a cleaning device 15. For image formation by the image forming part 1, the photosensitive drum 11 is rotated. Also, the charging device 12 electrically charges an outer circumferential surface of the photosensitive drum 11. The exposure device 13 exposes to light the outer circumferential surface of the photosensitive drum 11 to form an electrostatic latent image on the outer circumferential surface of the photosensitive drum 11. The developing device 14 feeds toner to the outer circumferential surface of the photosensitive drum 11 to develop a toner image from the electrostatic latent image. It is noted that the toner image on the outer circumferential surface of the photosensitive drum 11 is primarily transferred onto a later-described intermediate transfer belt 2. The cleaning device 15 eliminates toner that is remaining on the outer circumferential surface of the photosensitive drum 11 without being transferred onto the intermediate transfer belt 2.

As shown in FIG. 1, the image forming apparatus 100 also includes an intermediate transfer unit 200. The intermediate transfer unit 200 is settable to and removable from the body of the image forming apparatus 100. The intermediate transfer unit 200 includes an intermediate transfer belt 2. The intermediate transfer belt 2 is an endless belt.

The intermediate transfer belt 2 includes, as an example, a base material layer and a rubber layer (i.e., elastic layer) with which the base material layer is overlaid. Usable as a material of the base material layer are mixtures formed by mixing a polyimide resin or PVDF (polyvinylidene fluoride) with conductive materials such as ionic conductive material or conductive carbon so that electroconductivity is imparted to the mixtures. Usable materials of the rubber layer may be epichlorohydrin rubbers, chloroprene rubbers, polyurethane rubbers, and the like. In addition, a coat layer may also be provided to protect the rubber layer. Usable materials of the coat layer may be acrylic resins, silicon, fluororesins, and the like.

The intermediate transfer unit 200 includes a plurality of rollers 3. The plurality of rollers 3 are supported rotatable, respectively. Each of the plural rollers 3 has a rotating shaft extending in a widthwise direction perpendicular to the up/down direction. That is, axial directions of the plural rollers 3 are along the widthwise direction. It is noted that one side in the widthwise direction corresponds to forward side of the intermediate transfer unit 200 (i.e., forward side of the image forming apparatus 100), while the other side in the widthwise direction opposite to the one side corresponds to rearward side of the intermediate transfer belt 2 (i.e., rearward side of the image forming apparatus 100).

The intermediate transfer belt 2 is stretched and rotatably supported by the plural rollers 3. While keeping in contact with the outer circumferential surface of the photosensitive drum 11, the intermediate transfer belt 2 is turned around (orbitally turned) in a direction indicated by arrow D1 in the figure. That is, a turning direction of the intermediate transfer belt 2 is a direction perpendicular to the widthwise direction.

The plural rollers 3 include a driving roller 31. The driving roller 31 is one of the plural rollers 3. The driving roller 31, which is coupled to a motor M (see FIG. 3), is rotated with driving force transmitted from the motor M. The intermediate transfer belt 2 is turned subordinately with the rotation of the driving roller 31. The other rollers 3 out of the plural rollers 3 are rotated in subordination to the intermediate transfer belt 2.

The image forming apparatus 100 includes primary transfer rollers 21. The primary transfer rollers 21 are one component element of the intermediate transfer unit 200. The primary transfer rollers 21 are assigned one for each color of cyan, magenta, yellow and black. That is, the quantity of the primary transfer rollers 21 is a plurality (four). Each primary transfer roller 21 has a rotating shaft extending in the widthwise direction. The individual primary transfer rollers 21 are placed in an inner circumferential region of the intermediate transfer belt 2. It is noted that the inner circumferential region of the intermediate transfer belt 2 is a region which is surrounded by the inner circumferential surface of the intermediate transfer belt 2 and which is inward of an annular form as the intermediate transfer belt 2 as viewed in the widthwise direction. The primary transfer rollers 21 are placed in opposition to the photosensitive drums 11 of their corresponding colors, respectively, with the intermediate transfer belt 2 interposed therebetween.

The image forming apparatus 100 includes a secondary transfer roller 22. The secondary transfer roller 22 has a rotating shaft extending in the widthwise direction. The secondary transfer roller 22 is brought into pressure contact with the outer circumferential surface of the intermediate transfer belt 2 in the transfer position P1. The secondary transfer roller 22 nips the intermediate transfer belt 2 against the driving roller 31, forming a transfer nip against the intermediate transfer belt 2. The transfer nip is formed in the transfer position P1. The main conveyance path MP runs via the transfer nip.

In a print job, a sheet S is conveyed toward the transfer position P1 (i.e., transfer nip). The sheet S under conveyance passes through the transfer nip. That is, the intermediate transfer belt 2 comes into contact with the sheet S under conveyance on a downstream side of a contact position with each photosensitive drum 11 in the turning direction of the intermediate transfer belt 2.

The image forming parts 1 form toner images of their corresponding colors, respectively. Each primary transfer roller 21 primarily transfers a toner image onto the outer circumferential surface of the intermediate transfer belt 2. That is, the intermediate transfer belt 2 receives primary transfer of the toner image from the photosensitive drum 11.

The intermediate transfer belt 2 is turned around while carrying, on its outer circumferential surface, the toner image primarily transferred from the photosensitive drum 11. During passage of the sheet S through the transfer nip, the sheet S comes into contact with the outer circumferential surface of the intermediate transfer belt 2. The secondary transfer roller 22 receives application of a transfer voltage from a transfer-voltage power supply (not shown). The secondary transfer roller 22 forms a transfer electric field between itself and the intermediate transfer belt 2 to perform secondary transfer of the toner image onto the sheet S passing through the transfer nip.

The image forming apparatus 100 also includes a cleaning part 4. The cleaning part 4 may also be one component element of the intermediate transfer unit 200. The cleaning part 4 is placed in opposition to the outer circumferential surface of the intermediate transfer belt 2. The cleaning part 4 is placed downstream of the transfer position P1 in the turning direction of the intermediate transfer belt 2. The cleaning part 4 cleans the outer circumferential surface of the intermediate transfer belt 2. In more detail, the cleaning part 4 has a blade 40 (see FIG. 9) which is in contact with the outer circumferential surface of the intermediate transfer belt 2. The blade 40 eliminates toner remaining on the outer circumferential surface of the intermediate transfer belt 2 without being transferred onto the sheet S.

The image forming apparatus 100 further includes a fixing part 10. The fixing part 10 includes a heating roller and a pressure roller. fixing part 10 is placed at the fixing position P2. The heating roller contains a heater. The pressure roller is put into pressure contact with the heating roller. The heating roller and the pressure roller are put into pressure contact with each other to form a fixing nip at the fixing position P2.

In a print job, the sheet S that has been subjected to transfer process of the toner image passes through the fixing position P2. That is, the sheet S is pinched in the fixing nip between the heating roller and the pressure roller. The fixing part 10 heats the sheet S passing through the fixing position P2. In the fixing position P2, the sheet S is subjected to pressurization. Through the heating and the pressurization applied to the sheet S subjected to the transfer process of the toner image, the fixing part 10 makes the toner image fixed on the sheet S. After the fixing process, the sheet S is discharged onto a discharge tray ET.

The image forming apparatus 100 includes a conveyance part with its reference numeral omitted. The conveyance part includes a conveyance roller pair. The conveyance roller pair includes one pair of rollers. The one pair of rollers has a conveyance nip between the rollers. The conveyance roller pair is rotated to convey a sheet S that has entered the conveyance nip. The conveyance part conveys the sheet S along the main conveyance path MP. The conveyance part also conveys the sheet S along a double-side printing conveyance path DP.

As to print jobs, the image forming apparatus 100 is enabled to execute not only a one-side print job by which the toner image is printed on only one side of the sheet S, but also a double-side print job by which the toner image is printed on double sides of the sheet S. For execution of the double-side print job, the image forming apparatus 100 is equipped with the double-side printing conveyance path DP.

The double-side printing conveyance path DP branches from the main conveyance path MP at a branch position P3 which is located downstream of the fixing position P2 in the main conveyance path MP, as viewed in a sheet conveyance direction. Then, the double-side printing conveyance path DP merges with the main conveyance path MP at a merging position P4 which is located upstream of the transfer position P1 in the main conveyance path MP as viewed in the sheet conveyance direction.

In a case where a job to be executed is a one-side print job, the sheet S passes through the transfer nip only once, so that the sheet S passing through the transfer nip is subjected to one-time transfer process. Then, after the first-time transfer process, the sheet S is discharged onto the discharge tray ET as it is.

In another case where a job to be executed is a double-side print job, the sheet S is subjected to one-time transfer process for each of front and back sides of the sheet S, so that the sheet S passes through the transfer nip two times. In more detail, when the sheet S passes through the transfer nip for a first time, the transfer process is executed for one side of the sheet S. Subsequent to the first-time transfer process, the sheet S is switched back after a rear end of the sheet S has passed through the branch position P3 and before the sheet S has been completely discharged onto the discharge tray ET. As a result of this, the sheet S is pulled into the double-side printing conveyance path DP, starting with its rear end.

Thereafter, the sheet S is conveyed along the double-side printing conveyance path DP. Then, the sheet S on the double-side printing conveyance path DP is returned from the merging position P4 to the main conveyance path MP. The sheet S returned to the main conveyance path MP is conveyed along the main conveyance path MP, passing through the transfer nip once again. In this process, the sheet S has been inverted in terms of its orientation as to the front-and-back side of the sheet S, as compared with its orientation of a preceding-time passage through the transfer nip. Therefore, when the sheet S passes through the transfer nip for a second time, the transfer process is executed on the inverse side other than the foregoing one side of the sheet S.

Figure 3:
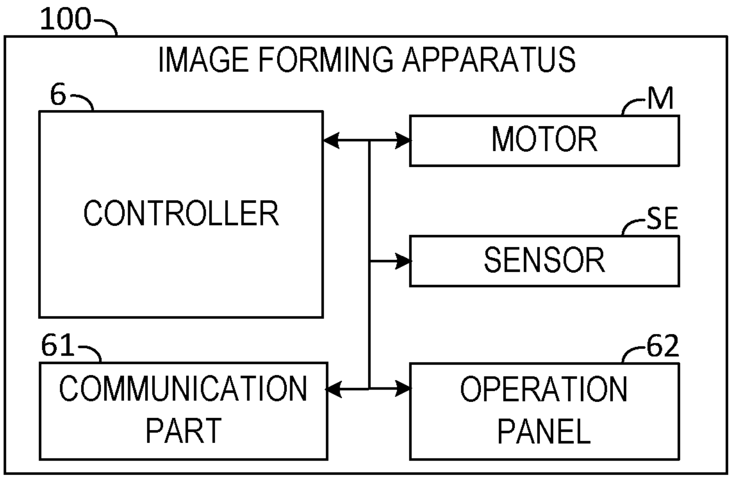
FIG. 3 is a block diagram of the image forming apparatus according to the embodiment.

As shown in FIG. 3, the image forming apparatus 100 also includes a controller 6. controller 6 contains a CPU and ASIC or other processing circuits. The controller 6 further contains ROM, RAM or other storage devices. The controller 6 controls print jobs to be executed by the image forming apparatus 100.

The controller 6 controls a motor M to properly turn around the intermediate transfer belt 2. That is, the controller 6 controls the intermediate transfer unit 200. The controller 6 may also be one component element of the intermediate transfer unit 200. In addition, a controller for exclusively controlling the intermediate transfer unit 200 may also be provided in the image forming apparatus 100.

The image forming apparatus 100 includes a communication part 61. The communication part 61 includes a communication circuit, communication-dedicated memory, communication-dedicated connector, and the like. The communication part 61 is communicatably connected to external devices via a LAN or other network. Available as such an external device is a user terminal device. The user terminal device may be a personal computer (PC), a smartphone, a tablet computer, or the like.

The controller 6 uses the communication part 61 to communicate with an external device. For example, print data of a print job is transmitted from the external device (user terminal device) to the image forming apparatus 100. The print data includes image data or the like to be printed in the print job. The controller 6 controls the print job on a basis of the print data.

The image forming apparatus 100 includes an operation panel 62. The operation panel 62 includes a touch screen, as an example. The operation panel 62 accepts settings, instructions and the like from a user. The operation panel 62 is connected to the controller 6. The controller 6 detects settings, instructions and the like accepted from the user by the operation panel 62.

<Meander Correction for Intermediate Transfer Belt>

Figure 4:
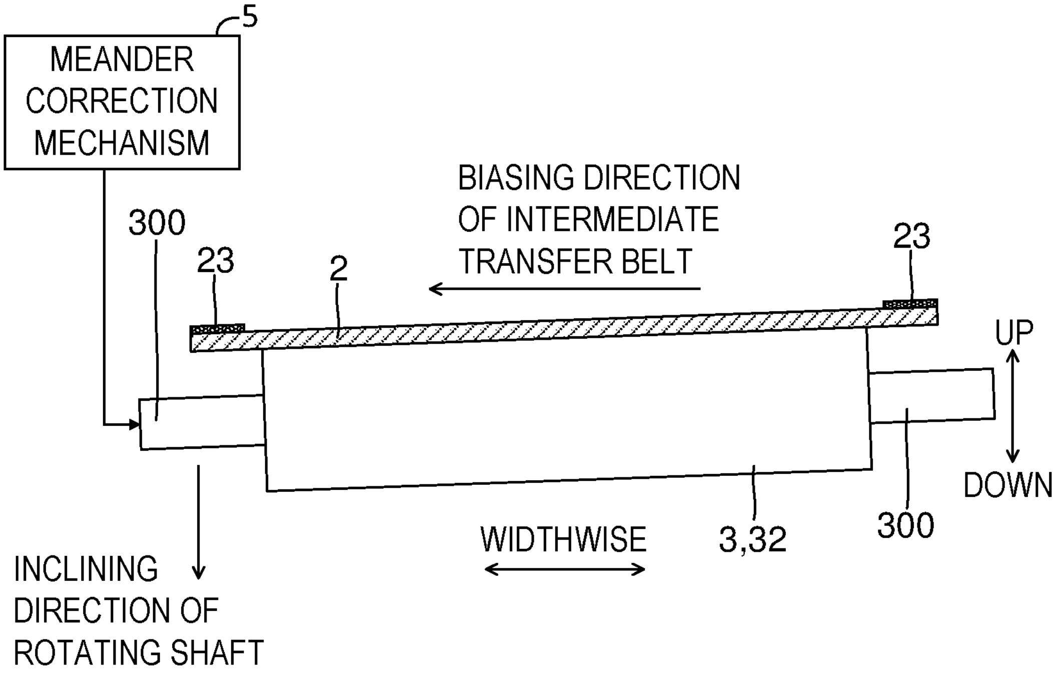
FIG. 4 is a view for explaining meander correction performed by an intermediate transfer unit according to the embodiment.

As shown in FIG. 4, the intermediate transfer unit 200 includes a meander correction mechanism 5. The meander correction mechanism 5 corrects any meander of the intermediate transfer belt 2. The meander correction mechanism 5 is coupled to a correction-targeted roller 32 out of the plural rollers 3 to correct any meander of the intermediate transfer belt 2 by inclining a rotating shaft 300 of the correction-targeted roller 32. For instance, on condition that the intermediate transfer belt 2 is biased toward one side (left side of the drawing in this instance) in its widthwise direction, the meander correction mechanism 5 makes the rotating shaft 300 of the correction-targeted roller 32 inclined left-downward.

The meander correction mechanism 5 is not limited to any particular configuration. The meander correction mechanism 5 may be so configured as to detect a meander quantity of the intermediate transfer belt 2 and, based on a detection result, change inclination of the rotating shaft 300 of the correction-targeted roller 32 (first configuration). Otherwise, the configuration may be such that when the intermediate transfer belt 2 has meandered, the inclination of the rotating shaft 300 of the correction-targeted roller 32 automatically changes (second configuration).

In the first configuration, the meander correction mechanism 5, although not shown, includes a meander quantity detection part for detecting a meander quantity of the intermediate transfer belt 2. The meander quantity detection part is not limited to any particular configuration. The meander quantity detection part outputs a value corresponding to a widthwise end-portion position of the intermediate transfer belt 2. The meander quantity detection part may be a transmission-type optical sensor which includes a lightemitting part and a light-receiving part vertically (up/down) opposed to each other with a widthwise end portion of the intermediate transfer belt 2 interposed therebetween. Also, the meander quantity detection part may be a CIS. The controller 6 receives an output value from the meander quantity detection part. Based on an output value of the meander quantity detection part, the controller 6 detects a meander quantity of the intermediate transfer belt 2.

Also in the first configuration, the meander correction mechanism 5, although not shown, includes a correction-dedicated motor to be coupled to the rotating shaft 300 of the correction-targeted roller 32, as well as a coupling member for coupling the rotating shaft 300 and the correction-dedicated motor to each other. The coupling member is a gear, a cam or the like. As the correction-dedicated motor is driven, an end portion of the rotating shaft 300 in its axial direction (i.e., widthwise direction) is moved in the up/down direction, with the result that the rotating shaft 300 is inclined (see FIG. 4). The controller 6 controls the correction-dedicated motor. Based on a meander quantity of the intermediate transfer belt 2, the controller 6 makes the rotating shaft 300 of the correction-targeted roller 32 inclined to correct the meander of the intermediate transfer belt 2.

Figure 5:
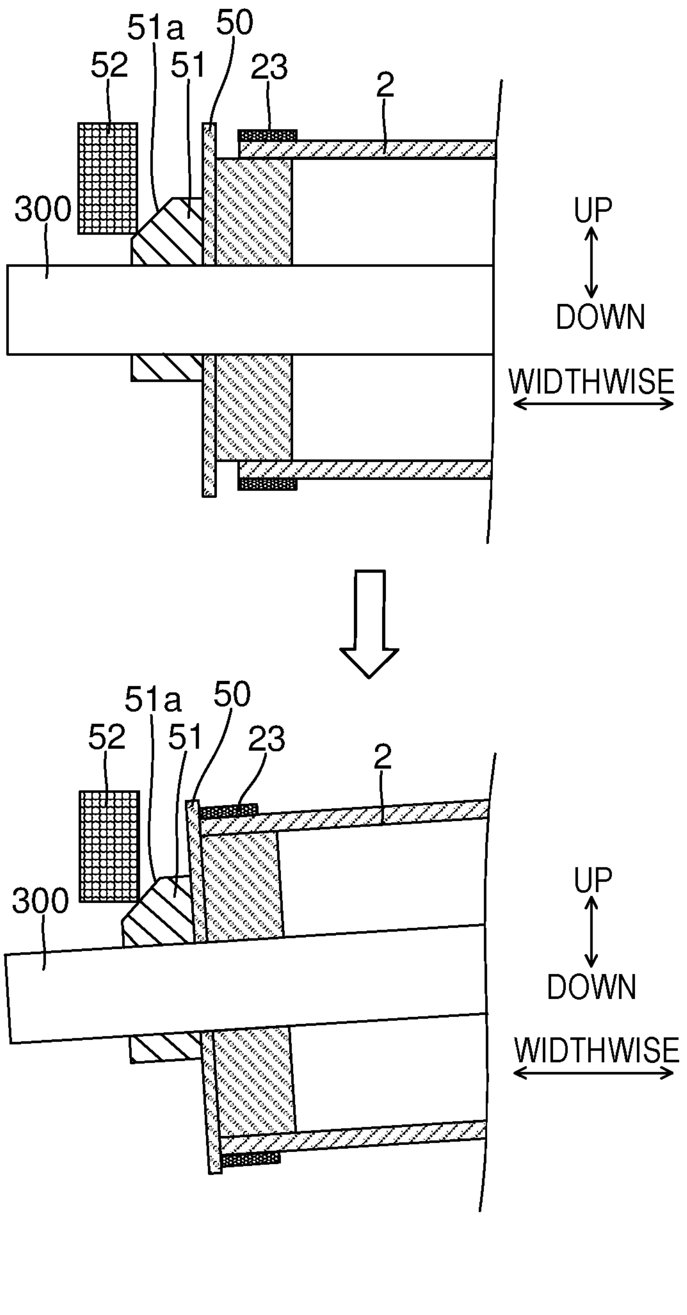
FIG. 5 is a schema of a meander correction mechanism according to the embodiment.

In the second configuration, as shown in FIG. 5, the rotating shaft 300 of the correction-targeted roller 32 is rotatably supported by a bearing 51 having a sloped portion 51*a* on its outer circumference. The bearing 51 is movable in the axial direction (i.e., widthwise direction) of the rotating shaft 300. The bearing 51 is placed widthwise-outward of a belt guide 50. The sloped portion 51*a* of the bearing 51 is formed so as to be downwardly sloped as directed widthwise outward. Above the sloped portion 51*a* of the bearing 51 is placed a main body guide 52. The main body guide 52 is fixed to a main body of the intermediate transfer unit 200 (e.g., a casing of the intermediate transfer unit 200) so as to be protruded downward from the main body into contact with the sloped portion 51*a* of the bearing 51.

In the second configuration, unless the intermediate transfer belt 2 meanders, the rotating shaft 300 is not inclined (see upper view of FIG. 5). When the intermediate transfer belt 2 meanders so that the belt guide 50 is pressed toward one side of the widthwise direction by the intermediate transfer belt 2, the bearing 51 is moved along with the belt guide 50 toward the one side of the widthwise direction (see lower view of FIG. 5). In this case, since the sloped portion 51*a* of the bearing 51 is in contact with the main body guide 52, an end portion of the rotating shaft 300 on the foregoing one side is moved downward, with the result that the rotating shaft 300 is inclined. As a consequence, the meander of the intermediate transfer belt 2 is corrected.

In this connection, a configuration using an anti-biasing guide, which is not shown, is also available. For example, an anti-biasing guide is provided at a widthwise end portion of the inner circumferential surface of the intermediate transfer belt. In this case, when the intermediate transfer belt is moved in the widthwise direction, the anti-biasing guide is put into contact with the rollers on which the intermediate transfer belt is stretched, with the result that the intermediate transfer belt is no longer moved in the widthwise direction. However, in this configuration, there occurs concentration of stress at border portion of the intermediate transfer belt with the anti-biasing guide, making the border portion more liable to breakage.

In another case, with the configuration using the meander correction mechanism 5, there is no need for providing any anti-biasing guide in the intermediate transfer belt 2. Therefore, breakage of the intermediate transfer belt 2 due to concentration of stress at portion of the intermediate transfer belt 2 can be suppressed. Further, since no anti-biasing guide is present on the inner circumferential surface of the intermediate transfer belt 2, it is allowable to set a later-described information recording area 2A (see FIG. 6) on the inner circumferential surface of the intermediate transfer belt 2.

<Recording of Belt Information>

Figure 6:
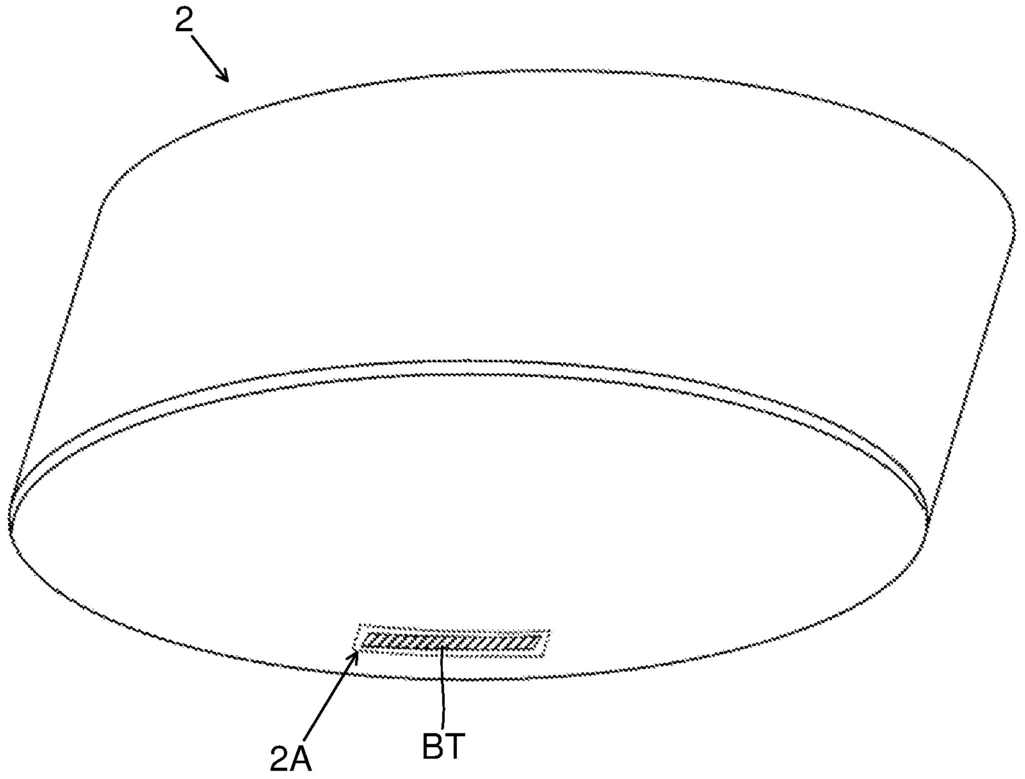
FIG. 6 is a perspective view of an intermediate transfer belt according to the embodiment.

As shown in FIG. 6, on the inner circumferential surface of the intermediate transfer belt 2, the intermediate transfer belt 2 has an information recording area 2A in which belt information BT has been recorded. The belt information BT is not limited to any particular contents. The belt information BT is, for example, information relating to the intermediate transfer belt 2, and information including a serial number of the intermediate transfer belt 2. Information relating to the intermediate transfer belt 2 may otherwise be belt resistance or the like. Without being limited to this, the belt information BT may be information relating to the image forming apparatus 100 or other information.

The belt information BT is not limited to any particular notation system. The belt information BT may be expressed either by one-dimensional code or by two-dimensional code. Further, the belt information BT may be expressed by characters, numerals, symbols, and the like. In FIG. 6, for convenience' sake, the belt information BT is indicated by hatching pattern.

In addition, toner is more likely to be deposited on the outer circumferential surface of the intermediate transfer belt 2 opposite to its inner circumferential surface. For this reason, placing the information recording area 2A on the outer circumferential surface of the intermediate transfer belt 2 would cause the information recording area 2A to be contaminated with toner, making it difficult to read the belt information BT. Thus, preferably, the information recording area 2A is placed on the inner circumferential surface of the intermediate transfer belt 2 (i.e., the belt information BT is recorded on the inner circumferential surface of the intermediate transfer belt 2).

For example, during maintenance work of the intermediate transfer unit 200, checking the belt information BT involves reading of the belt information BT. In this case, with the intermediate transfer belt 2 kept turned around, circumferential position of the information recording area 2A is adjusted so as to facilitate the reading of the belt information BT. Under this situation, since the information recording area 2A is placed on the inner circumferential surface of the intermediate transfer belt 2, the placement position of the information recording area 2A is less easily discernible.

Figure 7:
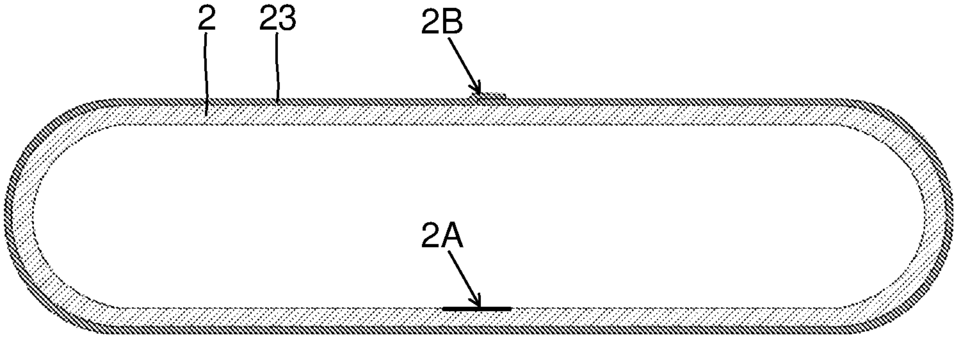
FIG. 7 is a view of the intermediate transfer belt according to the embodiment as viewed in a widthwise direction.

Therefore, as shown in FIG. 7, the intermediate transfer belt 2 has, on its outer circumferential surface opposite to its inner circumferential surface, a mark 2B for discrimination of the placement position of the information recording area 2A. The mark 2B is placed at a position on the outer circumferential surface of the intermediate transfer belt 2 where its positional relationship with the information recording area 2A comes to a specified relationship.

In this embodiment, the belt information BT is recorded on the inner circumferential surface of the intermediate transfer belt 2. However, since the mark 2B is placed on the outer circumferential surface of the intermediate transfer belt 2 and moreover the positional relationship between the information recording area 2A, in which the belt information BT has been recorded, and the mark 2B comes to a specified relationship, properly adjusting the circumferential position of the mark 2B provided on the outer circumferential surface of the intermediate transfer belt 2 allows the information recording area 2A to be moved to a position where the reading of the belt information BT is enabled. As a result of this, with the configuration in which the belt information BT is recorded on the inner circumferential surface of the intermediate transfer belt 2, checking process for the belt information BT (i.e., reading process of the belt information BT) can be promptly carried out.

In this connection, there is a variety of recording means for the belt information BT. The belt information BT may be printed directly (e.g., belt information BT is written by pen) on the inner circumferential surface of the intermediate transfer belt 2, or a seal with belt information printed thereon may be attached. However, in these cases, there is a possibility that print may become faint or seal may be peeled. That is, there is a possibility that reading of the belt information BT may become hard to do.

For these reasons, the belt information BT is recorded by marking on the inner circumferential surface of the intermediate transfer belt 2. The way of marking is not particularly limited, and a laser marking method may be used. Further, depth of the marking as well is not particularly limited. The depth of the marking is, for example, 10% or less relative to a thickness of the intermediate transfer belt 2.

The information recording area 2A is placed at at least a widthwise one-side end portion of the inner circumferential surface of the intermediate transfer belt 2. That is, the belt information BT is marked at a widthwise one-side end portion of the inner circumferential surface of the intermediate transfer belt 2. In the case where the belt information BT is recorded by marking, without any countermeasures taken, the widthwise one-side end portion of the intermediate transfer belt 2 would become more liable to breakage than the other-side end portion of the intermediate transfer belt 2 opposite to the one-side end portion.

Accordingly, the intermediate transfer unit 200 further includes reinforcing tape 23 for reinforcing the intermediate transfer belt 2. The reinforcing tape 23 is made from PET resin (polyethylene terephthalate). The reinforcing tape 23 has a width of about 5 mm. The reinforcing tape 23 has an adhesion layer on one side. The reinforcing tape 23 is attached in at least a widthwise one-side (same side as the side on which the information recording area 2A is placed) end portion of the outer circumferential surface of the intermediate transfer belt 2 so as to range over an entire circumferential length of the outer circumferential surface of the intermediate transfer belt 2. A widthwise end edge of the reinforcing tape 23 is combined together with a widthwise end edge of the intermediate transfer belt 2. That is, the reinforcing tape 23 is so placed as to have a width of about 5 mm from a widthwise one-side end edge toward the other side opposite to the one side of the outer circumferential surface of the intermediate transfer belt 2.

As a result of this, even with the belt information BT recorded by marking, declines in strength of the widthwise one-side end portion of the intermediate transfer belt 2 can be suppressed. The information recording area 2A is smaller in widthwise size than the reinforcing tape 23. The reinforcing tape 23 is attached over the entire region of the outer circumferential surface of the intermediate transfer belt 2 that is on one side opposite to the side on which the information recording area 2A is provided. In addition, the reinforcing tape 23 is attached also in the other-side end portion opposite to the widthwise one side of the intermediate transfer belt 2. The reinforcing tape 23 may be attached only in the widthwise one-side end portion of the intermediate transfer belt 2.

The reinforcing tape 23 is an annular matter extending along the inner circumferential surface of the intermediate transfer belt 2, as viewed in the widthwise direction. The reinforcing tape 23 endlessly extends along the inner circumferential surface of the intermediate transfer belt 2, as viewed in the widthwise direction.

Figure 8:
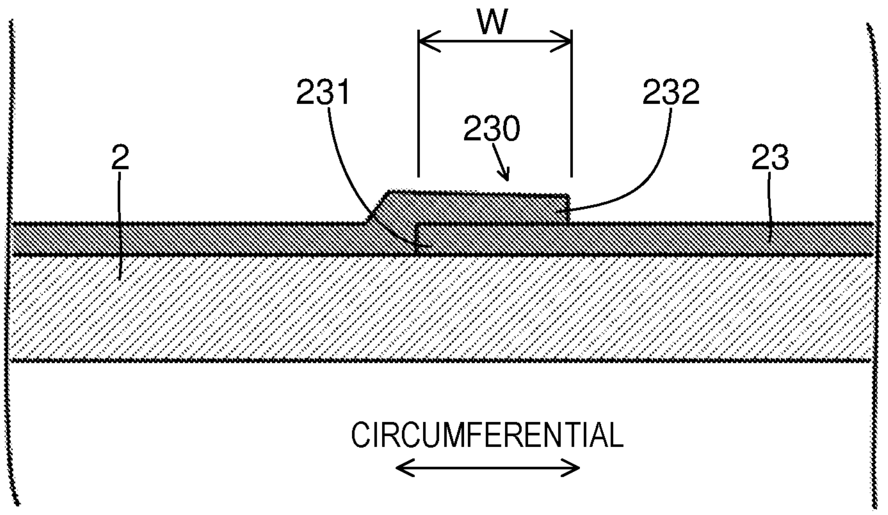
FIG. 8 is an enlarged view of a mark placed on the intermediate transfer belt according to the embodiment.

More specifically, as shown in FIG. 8, circumferential one-end portion 231 and other-end portion 232 of the reinforcing tape 23 are superimposed on each other in a thicknesswise direction of the intermediate transfer belt 2. As a result of this, the reinforcing tape 23 endlessly extends annularly, as viewed in the widthwise direction. A superposed portion 230 where the one-end portion 231 and the other-end portion 232 of the reinforcing tape 23 are superposed on each other is welded mutually between those end portions by ultrasonic welding method so as to be welded to the intermediate transfer belt 2. For example, the circumferential width W of the superposed portion 230 is 1 mm or more.

The superposed portion 230 of the reinforcing tape 23 differs from the other portions of the reinforcing tape 23 in terms of protruding extent (i.e., shape) from the outer circumferential surface of the intermediate transfer belt 2, as well as color or the like. For this reason, the superposed portion 230 is more easily detectable out of the reinforcing tape 23. Accordingly, the intermediate transfer belt 2 has the superposed portion 230 of the reinforcing tape 23 as the mark 2B.

In this embodiment, setting the superposed portion 230 of the reinforcing tape 23 as the mark 2B eliminates the need for separately providing a member serving as the mark 2B. As a consequence, with the configuration in which the belt information BT is marked on the inner circumferential surface of the intermediate transfer belt 2, it becomes possible to provide the mark 2B on the outer circumferential surface of the intermediate transfer belt 2 while suppressing increases in parts count and moreover suppressing declines in the strength of the intermediate transfer belt 2.

In addition, PET film as the reinforcing tape 23 is high in rigidity. Therefore, in a case where the reinforcing tape 23 is attached to the inner circumferential surface of the intermediate transfer belt 2, attaching work of the reinforcing tape 23 becomes hard work. In another case where the reinforcing tape 23 is attached to the outer circumferential surface of the intermediate transfer belt 2, attaching work of the reinforcing tape 23 becomes more easily attainable than the case in which the reinforcing tape 23 is attached to the inner circumferential surface of the intermediate transfer belt 2. Accordingly, in cases where the belt information BT is recorded by marking on the intermediate transfer belt 2, it is preferable that the information recording area 2A is provided on the inner circumferential surface of the intermediate transfer belt 2 and the reinforcing tape 23 is attached to the outer circumferential surface of the intermediate transfer belt 2.

Figure 9:
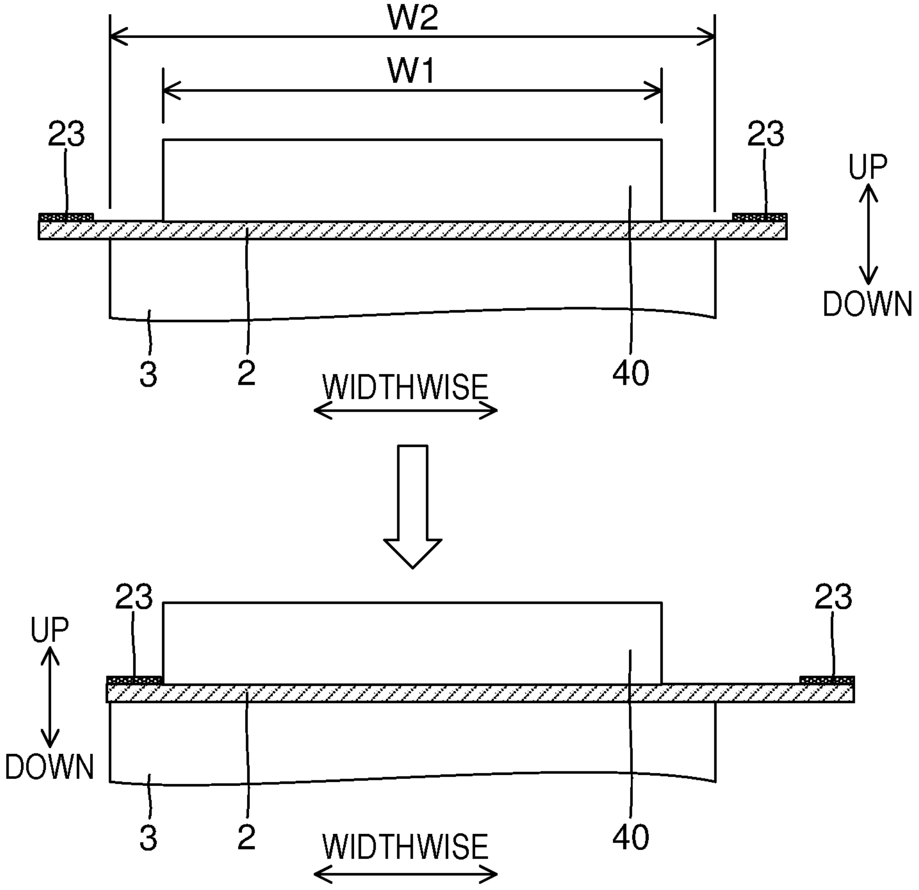
FIG. 9 is a view schematically showing a positional relationship between a roller and a blade in the intermediate transfer unit according to the embodiment.

Also, as shown in the upper view of FIG. 9, the blade 40 is put into contact with the outer circumferential surface of the intermediate transfer belt 2 to clean the outer circumferential surface of the intermediate transfer belt 2. A width W1 of the blade 40 is smaller than a width W2 of the roller 3.

In this embodiment, the reinforcing tape 23 is attached to the outer circumferential surface of the intermediate transfer belt 2. In this case, the reinforcing tape 23 is kept from making contact with the roller 3 even when the intermediate transfer belt 2 is biased in the widthwise direction (see lower view of FIG. 9). As a result, a load against the blade 40 is kept from varying to a large extent.

Figure 10:
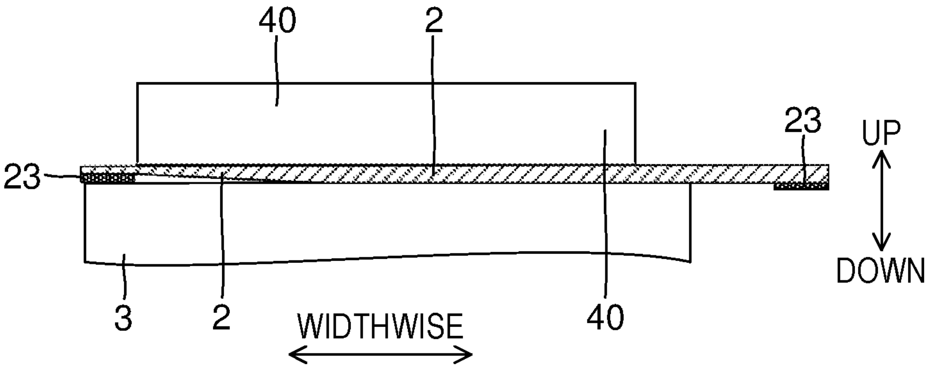
FIG. 10 is a view for explaining a phenomenon that occurs on condition that reinforcing tape shown in FIG. 9 is placed on an inner circumferential surface of the intermediate transfer belt.

In another case where the reinforcing tape 23 is attached to the inner circumferential surface of the intermediate transfer belt 2 as shown in FIG. 10, when the intermediate transfer belt 2 is biased in the widthwise direction, the reinforcing tape 23 overrides the roller 3. In this case, a widthwise end portion of the intermediate transfer belt 2 comes into a floating state, causing a possibility that the blade 40 in contact with the outer circumferential surface of the intermediate transfer belt 2 may be turned over.

Accordingly, in the case where the belt information BT is recorded by marking on the intermediate transfer belt 2, it is preferable that the information recording area 2A is provided on the inner circumferential surface of the intermediate transfer belt 2 and moreover the reinforcing tape 23 is attached to the outer circumferential surface of the intermediate transfer belt 2.

Figure 11:
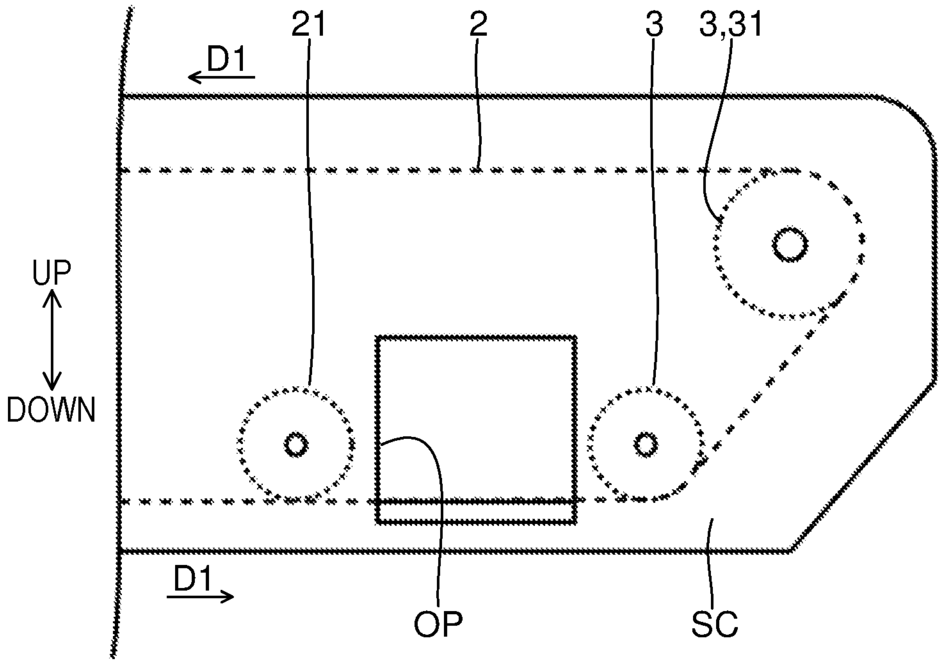
FIG. 11 is an enlarged view of around an opening in a side cover according to the embodiment.

As shown in FIG. 11, the intermediate transfer unit 200 includes side covers SC placed on widthwise both sides of the intermediate transfer belt 2. The side covers SC each cover an inner circumferential region of the intermediate transfer belt 2 from widthwise outward. The side covers SC rotatably support a plurality of primary transfer rollers 21. Also, the side covers SC rotatably support a plurality of rollers 3. As a result, at least the intermediate transfer belt 2, the plurality of primary transfer rollers 21, and the plurality of rollers 3 are unitized.

Each side cover SC has an opening OP extending through widthwise. The opening OP makes the inner circumferential region of the intermediate transfer belt 2 communicatable with outward in the widthwise direction. The opening OP makes the inner circumferential region of the intermediate transfer belt 2 partly exposed in the widthwise direction. As a result, the inner circumferential region of the intermediate transfer belt 2 can be checked through the opening OP.

Positioning of the opening OP relative to the side covers SC is predetermined based on the position of the inner circumferential surface of the intermediate transfer belt 2. The opening OP is placed at such a position within the side covers SC that the inner circumferential surface of the intermediate transfer belt 2 can be checked.

Figure 12:
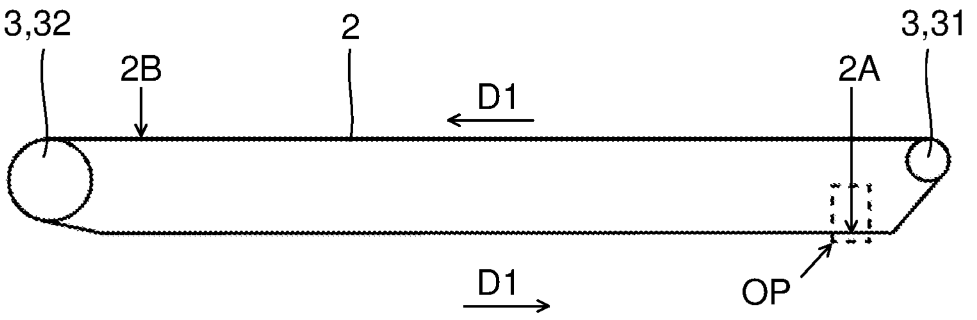
FIG. 12 is a view schematically showing a positional relationship between an information recording area and a mark in the intermediate transfer belt according to the embodiment.

More specifically, the information recording area 2A is placed at such a position as to be discernible via the opening OP when the intermediate transfer belt 2 is turned around so that the mark 2B is moved to a specified position. That is, the information recording area 2A is exposed widthwise outward of the opening OP when the intermediate transfer belt 2 is turned around so that the mark 2B is moved to the specified position. Further, the information recording area 2A is placed in a portion of the inner circumferential surface of the intermediate transfer belt 2 which is directed upward when the mark 2B is moved to the specified position. A state in which the mark 2B has been moved to the specified position is shown in FIG. 12.

Accordingly, moving the mark 2B to the specified position allows the information recording area 2A to be exposed widthwise outward through the opening OP. That is, moving the mark 2B to the specified position makes it possible to check the belt information BT through the opening OP. In addition, in a case where the belt information BT is expressed by code images (one-dimensional code, two-dimensional code, etc.), a code reader (not shown) is inserted from widthwise outward through the opening OP into the inner circumferential region of the intermediate transfer belt 2.

For example, during maintenance work of the intermediate transfer unit 200, operation mode of the intermediate transfer unit 200 is set to a specified mode. In other words, the specified mode is maintenance mode. For example, operating the operation panel 62 allows the mode of the intermediate transfer unit 200 to be changed to the specified mode. The operation panel 62 accepts a transition instruction for the specified mode from a user who performs the maintenance work.

When the operation panel 62 has accepted a transition instruction for the specified mode, the controller 6 operates the intermediate transfer unit 200 in the specified mode. In this case, the intermediate transfer unit 200 includes a sensor SE (see FIG. 3) for detecting the mark 2B of the intermediate transfer belt 2. The sensor SE, although not particularly limited, may be provided by using an optical sensor, a CIS, or the like. The sensor SE is connected to the controller 6. As a result, the controller 6 is enabled to detect a position of the mark 2B in the circumferential direction of the intermediate transfer belt 2, based on an output of the sensor SE.

In the specified mode, the controller 6 keeps the intermediate transfer belt 2 turning around and, based on an output of the sensor SE, decides whether or not the mark 2B has moved to the specified position. Then, when the mark 2B has moved to the specified position, the controller 6 halts the turning of the intermediate transfer belt 2. Under the condition that the specified mode is available as an operation mode of the intermediate transfer unit 200, checking of the belt information BT no longer involves the work of adjusting the circumferential position of the information recording area 2A by turning around the intermediate transfer belt 2, hence improvement in user's convenience.

In addition, for the maintenance work of the intermediate transfer unit 200, the intermediate transfer unit 200 may be removed from the main body of the image forming apparatus 100. In this case, for checking of the belt information BT, the user manually turns around the intermediate transfer belt 2 to adjust the circumferential position of the information recording area 2A. Even in a case where the intermediate transfer belt 2 is manually turned around, the presence of the mark 2B on the outer circumferential surface of the intermediate transfer belt 2 allows the checking work of the belt information BT to be promptly carried out.

The embodiment disclosed herein should be construed as not being limitative but being an exemplification at all points. The scope of the disclosure is defined not by the above description of the embodiment but by the appended claims, including all changes and modifications equivalent in sense and range to the claims.

What is claimed is:

1. An intermediate transfer unit comprising:

an endless intermediate transfer belt which is turned around while carrying a toner image on its outer circumferential surface; and a plurality of rollers on which the intermediate transfer belt is turnably stretched, wherein the intermediate transfer belt has, on its inner circumferential surface, an information recording area in which belt information has been recorded, and the intermediate transfer belt has a mark at a position in the outer circumferential surface where a positional relationship between the mark and the information recording area comes to a specified relationship.

2. The intermediate transfer unit according to claim 1, wherein the belt information is recorded by marking on the inner circumferential surface, the information recording area is placed at a widthwise one-side end portion of the inner circumferential surface, where the term widthwise refers to a direction perpendicular to a turning direction of the intermediate transfer belt, the intermediate transfer unit further includes reinforcing tape for reinforcing the intermediate transfer belt, the reinforcing tape is attached to at least the widthwise one-side end portion of the outer circumferential surface so as to range over an entire circumferential length of the outer circumferential surface, the circumferential one end portion and the other end portion of the reinforcing tape are superposed on each other, and the intermediate transfer belt has, as the mark, a superposed portion where the one end portion and the other end portion of the reinforcing tape are superposed on each other.

3. The intermediate transfer unit according to claim 2, further comprising a side cover for covering an inner circumferential region of the intermediate transfer belt from widthwise outward, wherein the side cover has an opening extending through in the widthwise direction, and the information recording area is placed at such a position that when the intermediate transfer belt is turned around so that the mark is moved to a specified position, the information recording area is discernible through the opening.

4. The intermediate transfer unit according to claim 1, further comprising a meander correction mechanism, wherein the meander correction mechanism inclines a rotating shaft of any of the plurality of rollers to correct any meander of the intermediate transfer belt.

5. An image forming apparatus comprising the intermediate transfer unit according to claim 1.

6. The image forming apparatus according to claim 5, further comprising a sensor for detecting the mark, and a controller for controlling turning of the intermediate transfer belt, wherein in a specified mode, the controller keeps the intermediate transfer belt turning around and, based on an output of the sensor, decides whether or not the mark has moved to a specified position, and when the mark has moved to the specified position, the controller halts the turning of the intermediate transfer belt.

* * * * *